United States Patent

Sidaris

[15] 3,688,981
[45] Sept. 5, 1972

[54] MANIFOLD GAS VALVE
[72] Inventor: Nickolas J. Sidaris, Cypress, Calif.
[73] Assignee: Honeywell Inc., Minneapolis, Minn.
[22] Filed: Aug. 17, 1970
[21] Appl. No.: 64,430

[52] U.S. Cl....................236/80, 137/495, 236/92 A
[51] Int. Cl.............................................G05d 23/275
[58] Field of Search......236/1, 80, 9; 137/489.5, 495

[56] References Cited

UNITED STATES PATENTS

| | | | |
|---|---|---|---|
| 2,247,060 | 6/1941 | Levine et al. | 236/9 |
| 2,583,006 | 1/1952 | Niesemann | 137/489.5 X |
| 2,617,233 | 11/1952 | Hoffman et al. | 137/489.5 |
| 2,924,387 | 2/1960 | Hajny | 236/1 |

Primary Examiner—Edward J. Michael
Attorney—Lamont B. Koontz and Alan M. Staubly

[57] ABSTRACT

A manifold gas valve having a diaphragm valve and an on-off valve controlling gas flow therethrough to a main burner and a pressure regulator valve therein controlling gas flow to a pilot burner. The outlet from the pressure regulator valve communicates with one side of the diaphragm of the diaphragm valve for biasing it open while the other side of the diaphragm responds to main gas outlet pressure to bias the valve closed, whereby a single adjustment of the pilot burner pressure regulator valve provides gas pressure adjustment for both the pilot burner gas and the main burner gas, both of which are controlled by the manifold valve. A modification of the invention provides step-opening of the diaphragm valve means controlling gas flow to the main burner.

10 Claims, 2 Drawing Figures

PATENTED SEP 5 1972

3,688,981

INVENTOR.
NICKOLAS J. SIDARIS
BY
Alan M. Staubly
ATTORNEY.

MANIFOLD GAS VALVE

This invention relates to a manifold gas valve controlling the flow of gas to a main burner and a pilot burner associated therewith in a heating system for a building. It is highly desirable that gas flowing to the two burners flow at a constant pressure, and to that end, valves controlling the flow to the burner have incorporated separate pressure regulators for the gas flowing to each burner. When two regulators are provided, manual adjustment means for each has also been provided so that field adjustment can take place. In this invention, adjustment for both gases can be accomplished by a single adjustment means, which materially aids in making their field adjustments.

Figure 1:
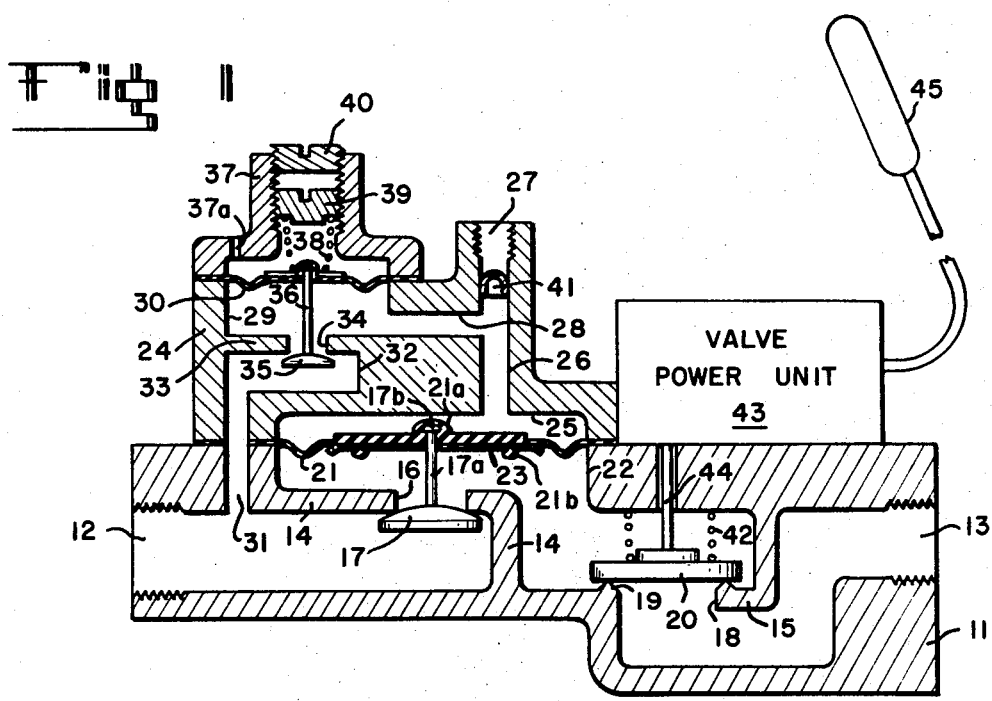
Figure 2:
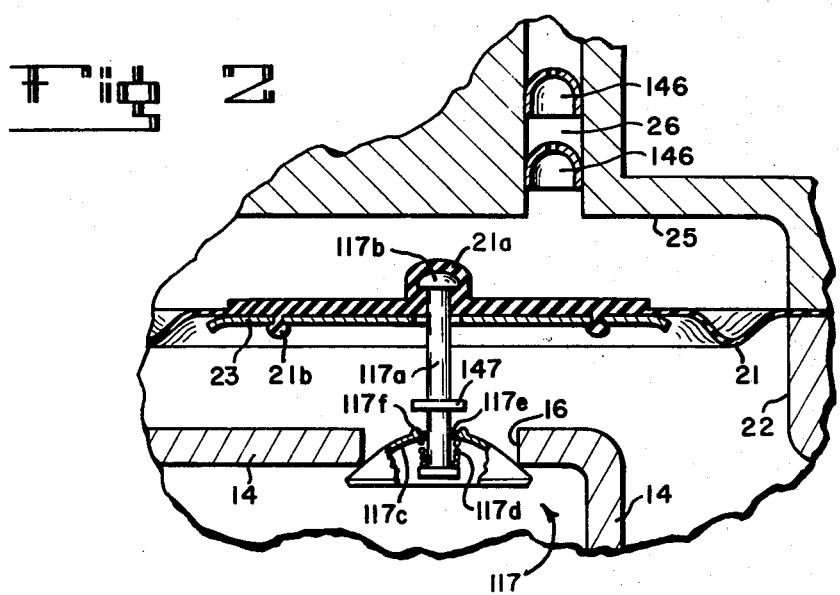

FIG. 1 of the drawing is a diagrammatic, horizontal cross-sectional view of a manifold valve embodying the invention and, FIG. 2 is an enlarged similar view of a modification of the invention which provides for step-opening of the main diaphragm valve means.

The manifold valve body is generally designated by the reference numeral 11 and has an inlet 12, an outlet 13 and two partition walls 14 and 15 therebetween. The wall 14 has an opening 16 therethrough providing a valve seat for a first control valve 17. The wall 15 has an opening 18 therethrough terminating in a valve seat 19 for a second control valve 20. A diaphragm 21 extends across a recess forming walls of a chamber 22 in the side of the valve body and is connected to the valve 17 by a stem 17a. The stem has a head 17b thereon which fits in a socket 21a in an enlarged portion of the diaphragm. A backing plate 23 is secured to the diaphragm by having buttons 21b on the diaphragm extending through aligned holes in the backing plate. The diaphragm is clamped around its peripheral edge to the body 11 by a housing member 24, which has a recess 25 therein providing a pressure chamber between the diaphragm and the housing 24. A passageway 26 extends from the recess or chamber 25 to a secondary outlet 27 adapted to be connected to a pilot burner. A second passageway 28 extends from the passageway 26 to a recess 29 extending inwardly from the outer surface of the housing 24 to form a pressure chamber adjacent diaphragm 30. A passageway 31 extends from the inlet passageway 12 to a chamber 32. A partition wall 33 divides the chamber 32 from the chamber 29 and has an opening 34 therethrough formed to provide a valve seat.

A valve 35 is connected by a stem 36, in a conventional manner, to the diaphragm 30 to control gas flow through the opening 34. The diaphragm 30 is clamped to the outer surface of the housing 24 by a second housing 37, which housing 37 has an atmospheric vent opening 37a therein. A coil compression spring 38 extends between the diaphragm 30 and an adjustable abutment member 39. A sealing plug 40 is threaded into the housing 37 above the adjustment member 39. It will thus be seen that the flow of gas from the inlet 12 to the pilot burner will be controlled by a conventional pressure regulator valve 35 to provide a uniform outlet pressure to the pilot burner. If the pilot burner used with the valve 11 is of the atmospheric type, which provides no restriction to gas flow, an orifice cup 41 is provided in the outlet to the pilot burner to provide a regulated gas flow. Should an orifice member of some kind be provided in the pilot burner, the orifice cup 41 would be dispensed with.

The valve 20 is biased against the valve seat 19 by means of a coil spring 42 and is adapted to be opened by a suitable valve power unit 43, through a valve stem 44 suitably secured to the valve 20. The power unit is illustrated as being of the bulb and bellows type, with the bulb 45 being temperature responsive. Obviously, other types of valve power units could be used in place of the bulb and bellows type, such as a rod and tube actuator.

As the drawing Figures are described as being horizontal cross-sectional, the diaphragm 21 lies in a vertical plane so that the weight of the diaphragm and the weight of the valve 17 has no effect on the bias of the valve to or away from the valve seat 16, the operating forces on the diaphragm being the gas pressure in the chamber 22 and in the chamber 25. If the pressure in chamber 25 is greater than that in 22, the valve 17 will open. If the pressure in 22 is greater than in 25, the valve 17 will close, that is, neglecting any resilient forces that may be present in the diaphragm itself.

Should the valve body be mounted with the diaphragm 21 lying in a horizontal plane, that is, considering that the FIG. 1 illustration is a vertical sectional view rather than a horizontal sectional view, the weight of the diaphragm, backing plate and valve 17 would aid the gas pressure in the chamber 25 so that a greater gas pressure in chamber 22 would be required to balance the total forces just mentioned. Since the chamber 25 is in communication with the outlet chamber 29 and passageway 28 of the pressure regulator 35, the pressure in the outlet from the valve 17 will be substantially the same as that in chamber 25 with the diaphragm arranged vertically, but with the diaphragm 21 arranged horizontally, the outlet pressure from valve 17 will necessarily be greater than the pressure in passageway 28 because of the extra force on the diaphragm due to the weight of the valve 17 assembly and diaphragm.

Obviously, other ways of varying the ratio of pressure in the outlets 28 and 13 can be accomplished by the addition of a spring between the diaphragm 21 and the housing 25 to increase the outlet pressure in 13 over 28, or by putting a spring between the backing plate 23 and the wall 14 to cause the gas pressure in the outlet 13 to be less than the pressure in the passageway 28 leading to the pilot burner.

The operation of the invention as illustrated in FIG. 1 of the drawing is as follows:

With the valve 20 closed, pressure between the valves 20 and 17 will be substantially inlet pressure, which will cause the valve 17 to be closed against valve opening 16. The valve 35 will normally always be open a certain degree, being wide open if a valve upstream of the inlet 12 is closed, and being in a gas pressure regulating position with respect to the valve seat 34 when gas is being supplied to a pilot burner. Upon a call for heat, the valve power unit will move the valve 20 to its open position, relieving the pressure in chamber 22 and causing gas to flow past the valves 17 and 20 to the main burner. The valve 17 will then adjust to the proper position with respect to the valve seat 16 to equalize the pressures in chambers 25 and 22, assuming the diaphragm is in a vertical plane as initially described. Should it be desired to increase the gas pressure to the pilot burner and the main burner, the plug 40 would be removed and the adjustable member 39 would be threaded further into the housing 37 to additionally cause the spring 38 to require a greater gas pressure in the chamber 29 to reduce the opening around valve 35. With the adjustment of the pilot gas pressure, the main gas pressure is simultaneously adjusted at substantially the same rate in the same direction. When the demand for heat ceases, the valve 20 will close, which, in turn, will cause the pressure in chamber 22 to move the diaphragm and valve 17 to their closed positions. The gas will continue to flow to the pilot burner unless the gas supply is cut off to the valve body 11.

The embodiment of the invention illustrated in FIG. 2 of the drawing differs from that of FIG. 1 in that a double valve, generally designated by the reference numeral 117, is substituted for the valve 17 of FIG. 1 and orifice means 146 is provided in the passageway 26 between passageway 28 and chamber 25. Preferably the orifice means 146 consists of two cup-shaped orifice members similar to the orifice member 41 between the passageway 28 and the pilot burner outlet. By having two orifices, the opening in each may be of larger diameter than if a single orifice member is used and thus be less susceptible to clogging. The valve 117 consists of a large valve 117c and a smaller valve in the form of a spring 117d positioned between the valve stem 117a and the inner surface of the valve 117c. The stem 117a extends through a larger diameter opening 117e in the valve 117c so that when the stem 117a is moved by the diaphragm in a valve opening direction, the coils of the spring 117 d will open and provide a minimum flow of gas through the opening 117e. The minimum flow of gas on the first step of valve opening may be predetermined by either controlling the size of the opening between the stem 117a and the periphery of the hole 117e or the openings between the coils of spring 117d. As the gas bleeds slowly through the orifice members 146 into the chamber 25, an annular shoulder 147 will move against beads 117f, formed on the valve 117c around the opening 117e, to pick up the valve 117c and move it to its open position with respect to its seat. It is thus seen that, with this arrangement provides a lost connection between valve 117a and, therefore, a suitable step opening of the valve 117 is provided. This provides an initial minimum flow of gas to the main burner for ignition purposes and then, after a time delay, an increase in the flow to the main burner. If desired, the spring 117d may be conical in shape and not have its coils close against each other so as to restrict gas flow.

Obviously, this modification of the invention can be similarly modified by the change in position of the diaphragm from a vertical mounting to a horizontal mounting or by the use of a spring on one side or the other of the diaphragm.

The operation of this modification of the invention is substantially the same as that of FIG. 1 with the exception that the gas flow opens and closes in two steps rather than in one step.

The embodiments of the invention in which an exclusive property or right is claimed are defined as follows:

1. A manifold gas valve comprising a valve body having an inlet, a main outlet for connection to a main gas burner and a second outlet for connection to a pilot burner, a main passageway extending from said inlet to said main outlet, a second passageway extending from said inlet to said second outlet, a first valve seat in said main passageway, a first valve means arranged to control gas flow through said first valve seat, a movable wall operably connected to said first valve means and being exposed to gas pressure in said main passageway on one side thereof for biasing said first valve means toward its closed position and being exposed on its other side to gas pressure in said second passageway for biasing said first valve means toward its open position, pressure regulator valve means in said second passageway and arranged to maintain a uniform pressure on said movable wall, and control valve means in said main passageway between said first valve means and said main outlet.

2. A manifold gas valve as defined in claim 1 wherein said movable wall is a diaphragm.

3. A manifold gas valve as defined in claim 1 wherein said control valve means is power operated.

4. A manifold gas valve as defined in claim 1 wherein said control valve means includes a temperature responsive valve means actuator.

5. A manifold gas valve as defined in claim 1 wherein said second passageway has a restriction therein restricting gas flow from said pressure regulator valve means and said movable wall.

6. A manifold gas valve as defined in claim 1 wherein said pressure regulator valve means has means that is adjustable to change the regulated pressure at said second outlet and said first outlet in the same direction and at substantially the same rate.

7. A manifold gas valve as defined in claim 1 wherein said control valve means includes an on-off type of valve so that when it is open the main outlet pressure will be substantially the same as the pressure in said first passageway adjacent said movable wall.

8. A manifold valve as defined in claim 1 wherein said movable wall is a diaphragm of such weight when combined with the weight of said first valve means and the pressure in said second passageway does not require the gas pressure acting on the other side of said diaphragm to provide gas pressure to the main burner that is substantially greater than the regulated gas pressure to the pilot burner.

9. A manifold valve as defined in claim 1 wherein gas flow restricting means is provided between said movable wall and said pressure regulator valve means, and said first valve means is constructed to give one rate of gas flow upon initial movement of the movable wall in the valve means opening direction and then an additional rate of gas flow upon a further predetermined additional movement of the movable wall in the valve means opening direction.

10. A manifold valve as defined in claim 9 wherein said first valve means includes two sequentially opened valves having a lost-motion connection therebetween.

* * * * *